No. 805,027. PATENTED NOV. 21, 1905.
F. W. PAWLING & F. R. MILLER.
MACHINE FOR MAKING HOLLOW GLASSWARE.
APPLICATION FILED JULY 24, 1902.
7 SHEETS—SHEET 3.
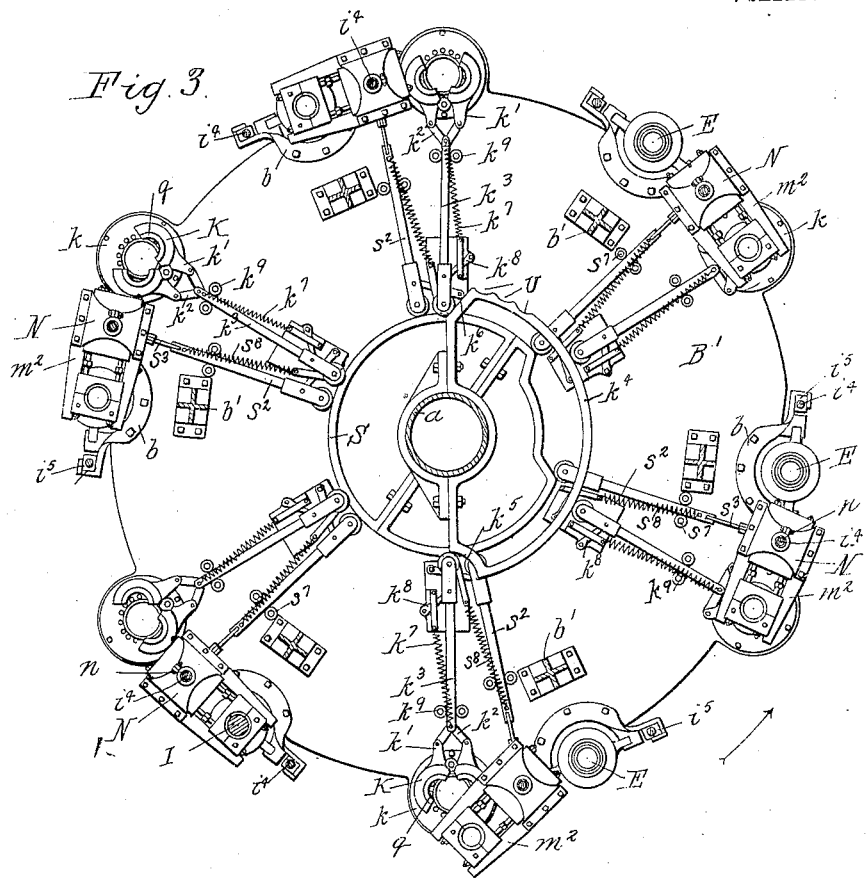
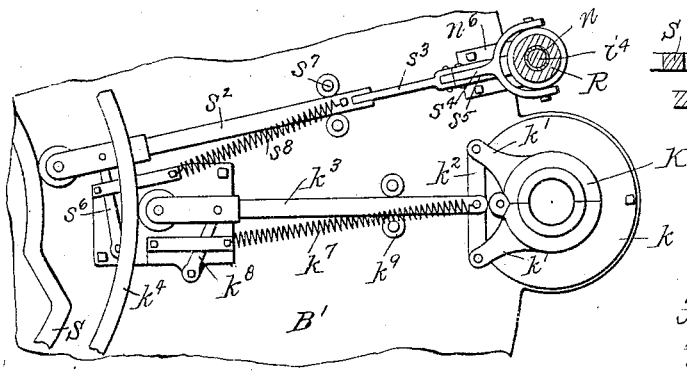
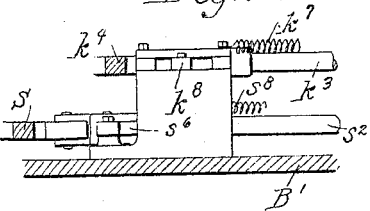
Witnesses:
E. A. Volk.
John N. Snyder Jr.
Francis W. Pawling
Frank R. Miller
Inventors
By Wilhelm Bonner
Attorneys No. 805,027. PATENTED NOV. 21, 1905.
F. W. PAWLING & F. R. MILLER.
MACHINE FOR MAKING HOLLOW GLASSWARE.
APPLICATION FILED JULY 24, 1902.
7 SHEETS—SHEET 4.
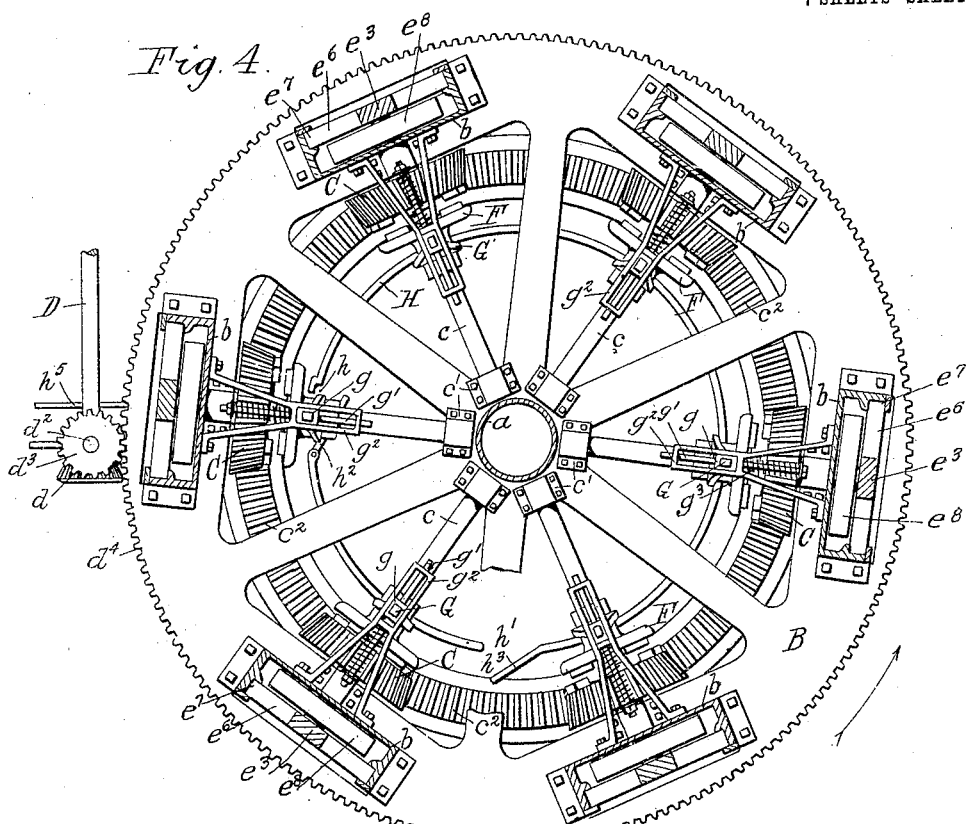
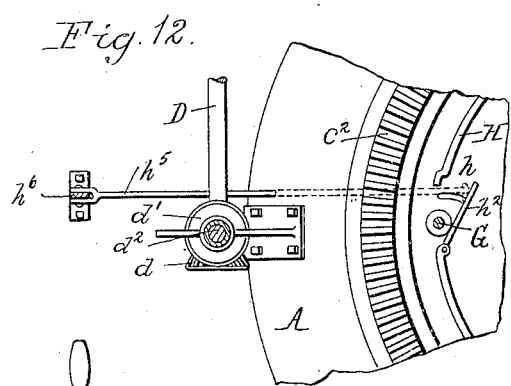
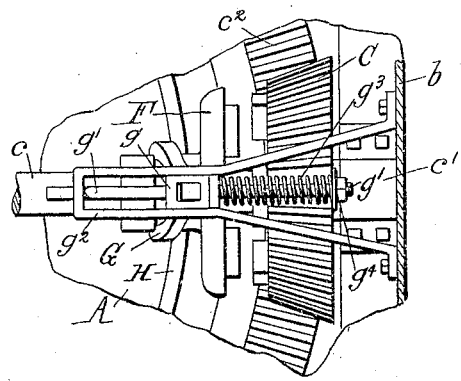
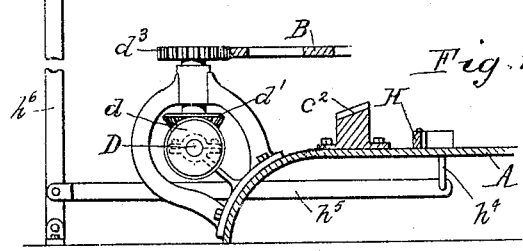

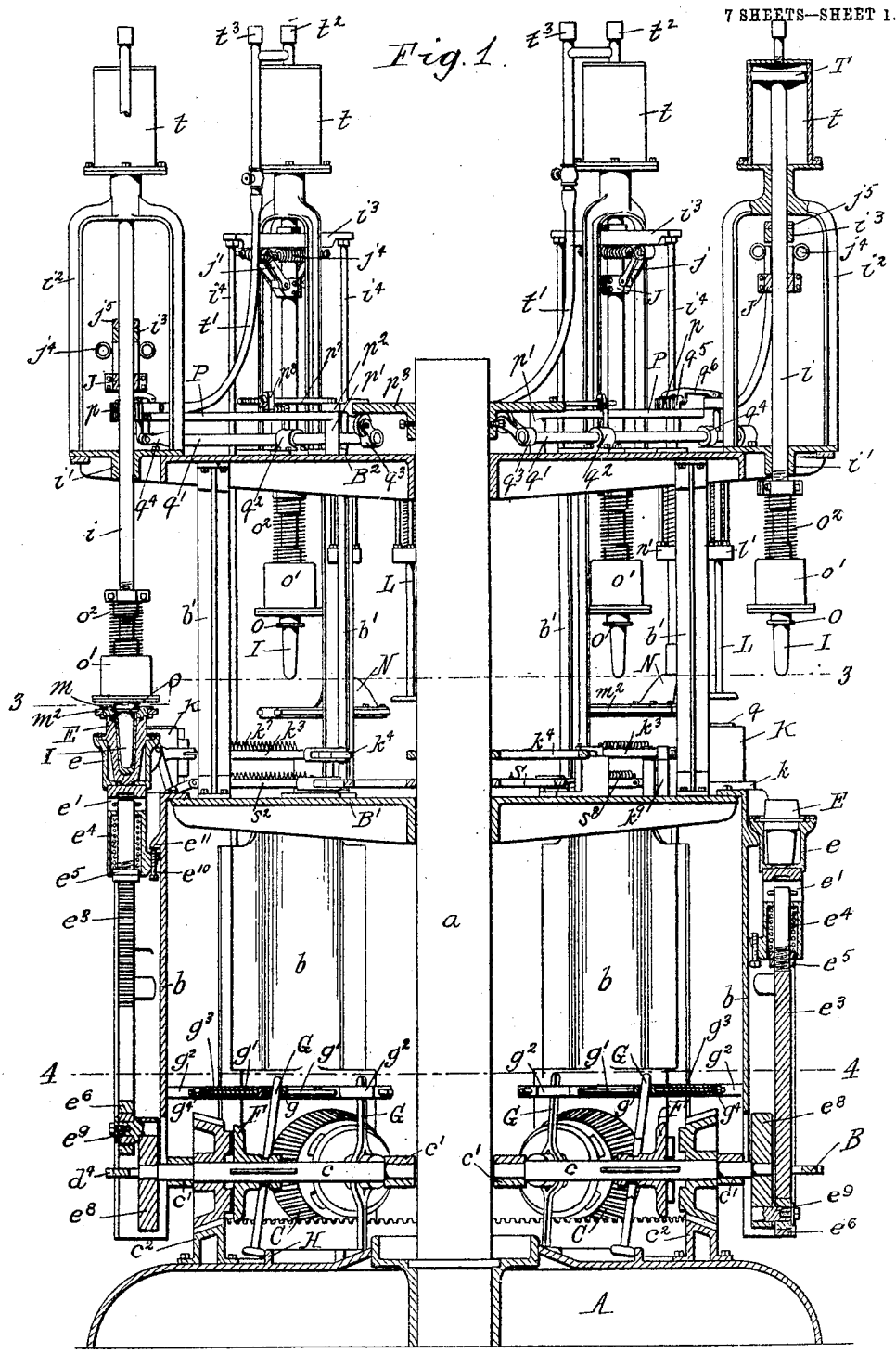

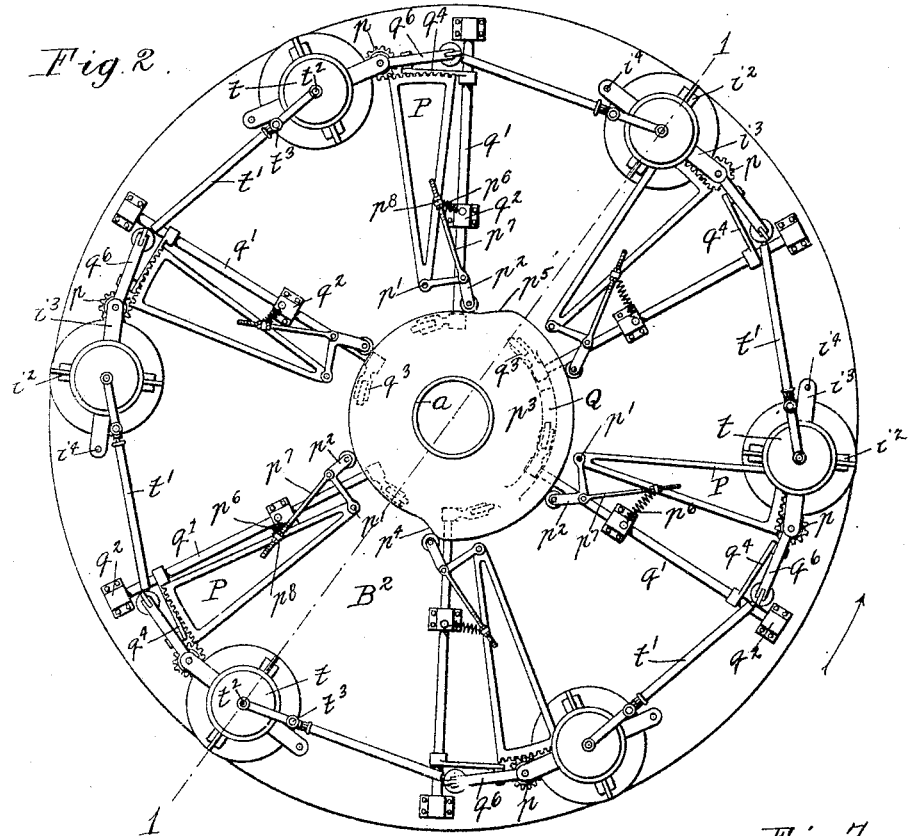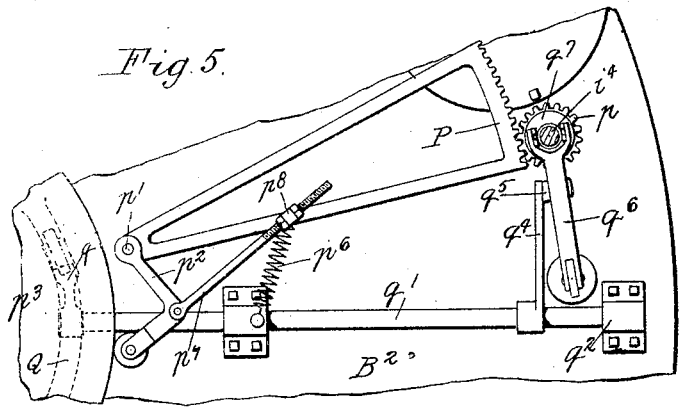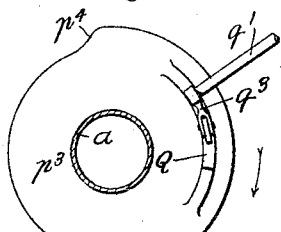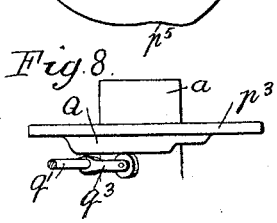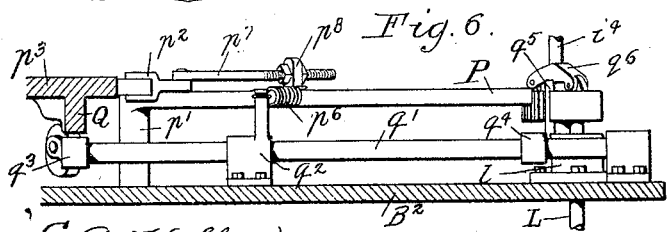

No. 805,027. PATENTED NOV. 21, 1905.
F. W. PAWLING & F. R. MILLER.
MACHINE FOR MAKING HOLLOW GLASSWARE.
APPLICATION FILED JULY 24, 1902.
7 SHEETS—SHEET 5.
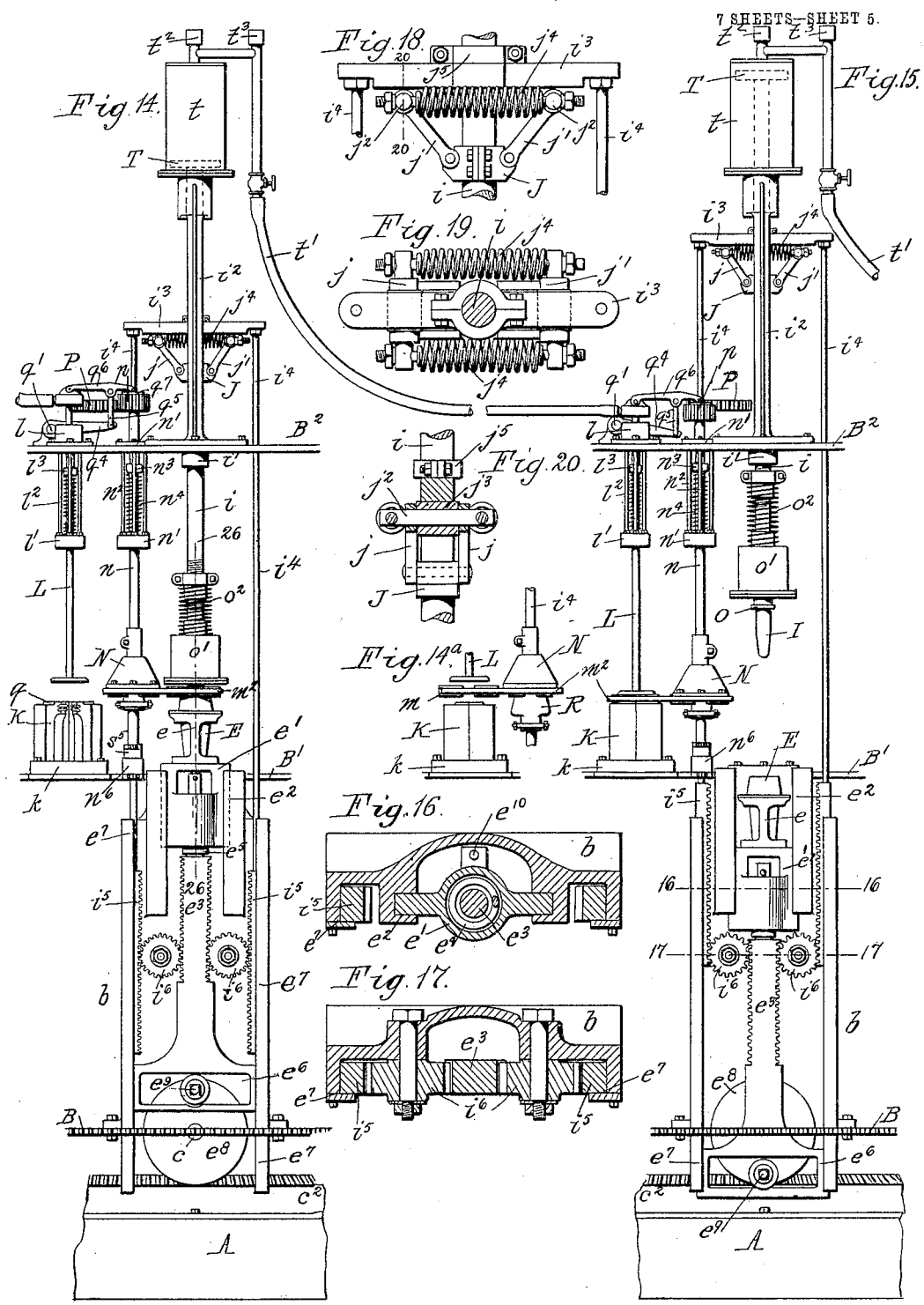
Witnesses: E. A. Volk. John N. Snyder.
Inventors: Francis W. Pawling, Frank R. Miller.
By Wilhelm Bonner, Attorneys.

No. 805,027. PATENTED NOV. 21, 1905.
F. W. PAWLING & F. R. MILLER.
MACHINE FOR MAKING HOLLOW GLASSWARE.
APPLICATION FILED JULY 24, 1902.
7 SHEETS—SHEET 6.
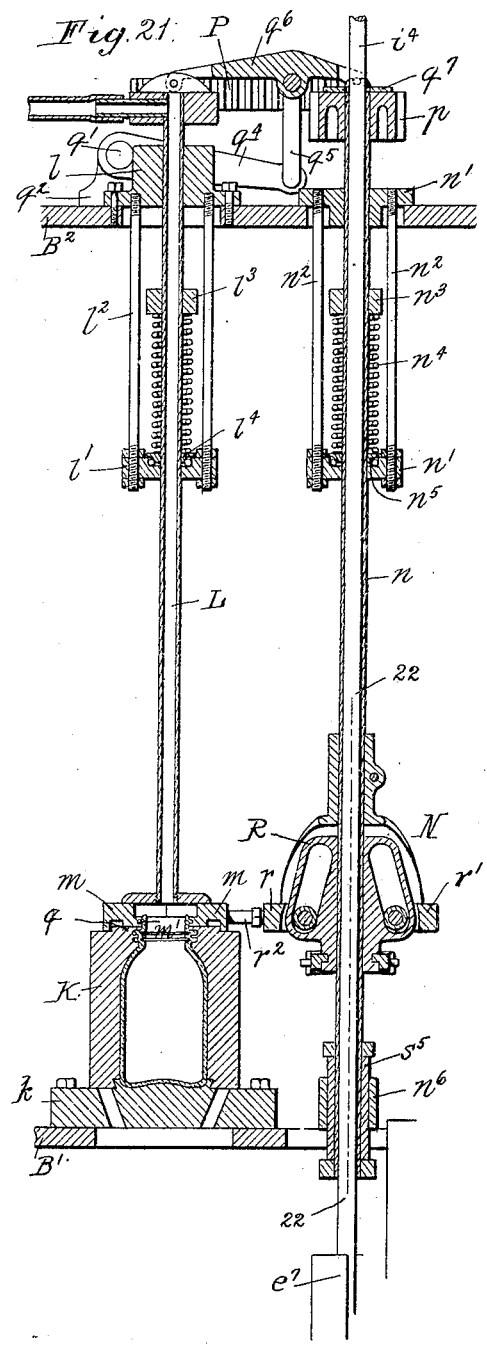
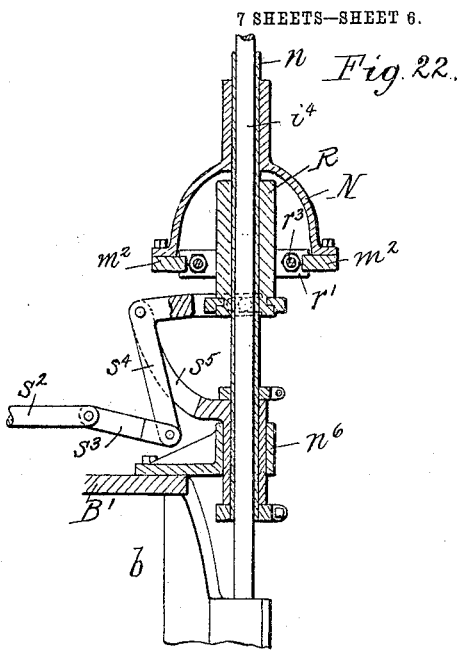
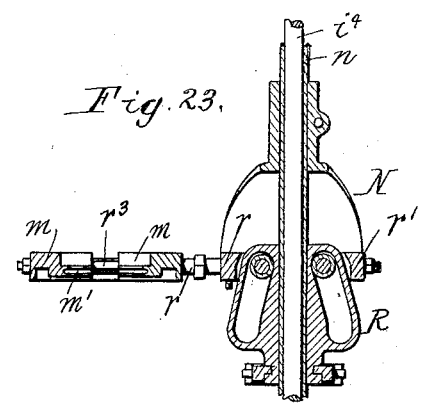
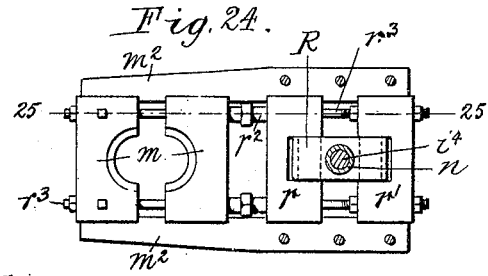
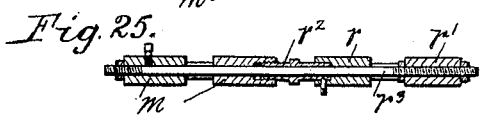
Witnesses:
E. A. Volk
John N. Snyder, Jr.
Francis W. Pawling
Frank R. Miller Inventors.
By Wilhelm Bonner
Attorneys.

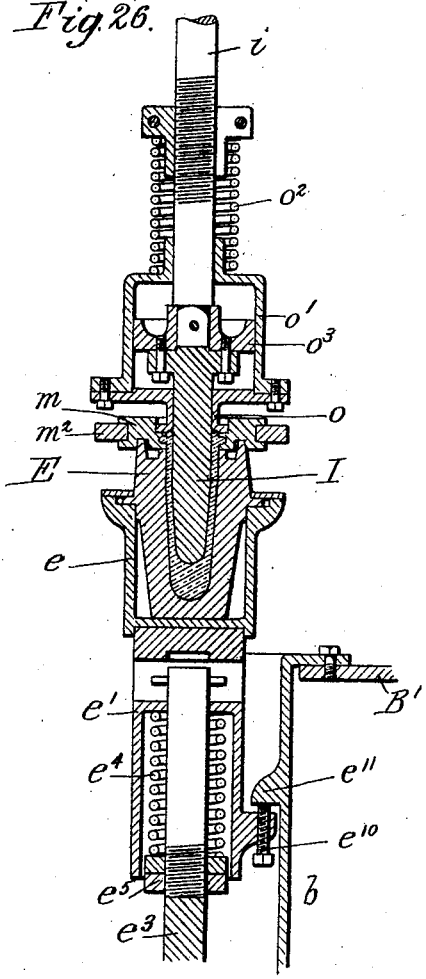

UNITED STATES PATENT OFFICE.

FRANCIS W. PAWLING AND FRANK R. MILLER, OF LOCKPORT, NEW YORK.

MACHINE FOR MAKING HOLLOW GLASSWARE.

No. 805,027.     Specification of Letters Patent.     Patented Nov. 21, 1905.

Application filed July 24, 1902. Serial No. 116,775.

*To all whom it may concern:*

Be it known that we, FRANCIS W. PAWLING and FRANK R. MILLER, citizens of the United States, and residents of Lockport, in the county of Niagara and State of New York, have invented new and useful Improvements in Machines for Making Hollow Glassware, of which the following is a specification.

This invention relates to a machine for making hollow glassware—such, for instance, as fruit-jars, bottles, &c.

The object of the invention is to provide a desirable machine for this purpose which is of simple construction and large capacity and capable of producing a practically perfect article.

The machine hereinafter described and shown in the drawings as an embodiment of the invention is designed for making fruit-jars and, briefly stated, is constructed and operated as follows: A continuously-rotating frame or carriage is provided with a plurality of press and blow molds arranged in pairs of one press-mold and a companion blow-mold. A batch of molten glass is introduced into one of the press-molds, which rises vertically to meet a lowering press-plunger, which presses the batch of glass to make a hollow blank of the form of the press-mold, and a neck-mold or bead-ring is arranged over the press-mold and forms the external bead or lip around the mouth of the jar or article. The press-mold and plunger then separate, leaving the blank suspended from the bead-ring, which then swings horizontally to carry the blank into the open blow-mold. The latter, which consists of separable sections, then closes, and the article is blown, after which the bead-ring, which also consists of separable sections, opens and moves away from the blow-mold, leaving the finished article in the blow-mold. The article remains in the blow-mold until the glass has cooled sufficiently for it to properly set, after which the blow-mold opens and the article is removed by an attendant. All of the above operations are performed automatically during the continuous movement of the rotary carriage, and the operations are so timed that a batch of molten glass is introduced into a press-mold at one point in the rotation of the carriage and the completed article taken from the companion blow-mold just before the carriage makes one complete revolution and the press-mold arrives at the point to receive another batch of glass. The glass is introduced into the press-molds and the finished articles taken from the blow-molds in succession.

In the accompanying drawings, consisting of seven sheets, Figure 1 is a vertical sectional elevation through the machine on line 1 1, Fig. 2, showing a blank being pressed in the press-mold at the left-hand side of the machine. Fig. 2 is a plan view of the machine. Fig. 3 is a horizontal section thereof, partly in plan, in line 3 3, Fig. 1. Fig. 4 is a horizontal section thereof, partly in plan, in line 4 4, Fig. 1. Fig. 5 is a plan view, partly in section, on an enlarged scale, of the mechanism for turning the crane carrying the bead-ring. Fig. 6 is a sectional elevation thereof. Fig. 7 is an inverted plan view of the cam and rock-shaft for lowering the bead-ring and blow-pipe on the blow-mold. Fig. 8 is a side elevation thereof. Fig. 9 is an enlarged plan view, partly in section, of the mechanism for opening and closing the blow-mold and the bead-ring. Fig. 10 is an enlarged detail sectional elevation of the cams and inner ends of the rods for opening and closing the blow-mold and bead-ring. Fig. 11 is an enlarged fragmentary plan view of one of the mechanisms for rotating the crank for operating the press-mold. Fig. 12 is an enlarged plan view, partly in section, of the gear for rotating the carriage and track for operating the clutch mechanism. Fig. 13 is an enlarged fragmentary sectional elevation thereof. Fig. 14 is a fragmentary elevation showing one of the press-molds and plungers and blow-molds, the press-mold and plunger being together in the act of pressing a blank. Fig. 14$^a$ is a fragmentary elevation of a blow-mold and bead-ring, showing the position of the parts before the bead-ring is lowered on the blow-mold. Fig. 15 is a view similar to Fig. 14, showing the press-mold and plunger separated and the parts in the position occupied when the jar is being blown. Fig. 16 is an enlarged horizontal section in line 16 16, Fig. 15, through the yoke carrying the press-mold and the guides therefor. Fig. 17 is a horizontal section, on an enlarged scale, in line 17 17, Fig. 15, through the yoke-operating gears. Fig. 18 is an enlarged detail elevation of the regulating device for preventing excessive pressure of the blank. Fig. 19 is a plan view, partly in section, thereof. Fig. 20 is a vertical section in line 20 20, Fig. 18. Fig. 21 is an enlarged vertical section through the blow-mold, bead-ring, bead-ring-operating wedge and associated parts. Fig. 22 is a section through the operating mechanism for opening and closing the bead-ring in line 22 22, Fig. 21. Fig. 23 is an enlarged sectional detail view through the mechanism for opening and closing the bead-ring, showing the bead-ring open. Fig. 24 is an enlarged plan view, partly in section, of the bead-ring and means for opening and closing the same. Fig. 25 is a sectional view through the bead-ring in line 25 25, Fig. 24. Fig. 26 is an enlarged vertical section through the press-mold and plunger in line 26 26, Fig. 14.

Like letters of reference refer to like parts in the several figures.

In the machine shown in the drawings six sets of press and blow molds with their coöperating press-plungers, bead-rings, blow-pipes, and operating mechanisms are employed; but the machine may be provided with a greater or less number of sets, or only a part of the sets may be operated, if desired.

A represents a stationary bed or support of any suitable construction for the machine, and $a$ an upright stationary shaft or axle for the rotary frame or carriage which supports the molds and various coöperating parts of the machine. The carriage shown in the drawings comprises a lower horizontal wheel or plate B, a horizontal mold-table B' above the latter, and a top table or horizontal support $B^2$ above the mold-table. These parts are connected rigidly together by vertical standards $b$ between the wheel and mold-table and vertical standards $b'$ between the mold-table and the top table or support. The standards may be of any suitable form and are securely bolted or otherwise secured to the wheel and tables. The upright shaft $a$ projects loosely through central bearing-openings in the wheel and tables, so that the frame can rotate about it. The table is rotatably supported on the bed by suitable means, such as gear-wheels C, which are loosely journaled on radial shafts $c$, which are journaled in suitable bearings $c'$ on the horizontal frame-wheel and roll on a circular toothed rack or gear-rim $c^2$, fixed on the top of the stationary bed.

The mechanism shown for rotating the carriage, Figs. 4, 12, and 13, comprises a power-shaft D, provided with a bevel gear-wheel $d$, which meshes with a bevel gear-wheel $d'$, secured to a vertical shaft $d^2$, mounted in a suitable bearing supported on the bed. The vertical shaft $d^2$ is provided with a gear-pinion $d^3$, which meshes with gear-teeth $d^4$ on the periphery of the frame-wheel B. Any other preferred means may be provided for rotating the frame.

E represents the press-molds, which are arranged at equidistant points around the rotary carriage. Each mold is in the form of a solid open-topped cup or vessel and is removably retained in a holder $e$, which is secured to a vertically-movable head or slide $e'$, Figs. 1, 14 to 17, which is mounted to slide in suitable vertical guides or ways $e^2$, provided on the standards $b$, connecting the frame-wheel and mold-table. The head is reciprocated to raise and lower the mold by suitable mechanism, preferably constructed as follows: $e^3$ represents a pitman or yoke which is connected at its upper end to the mold-head by a yielding connection which may be formed by a spring $e^4$, located in a socket in the mold-head and resting at its lower end on an adjustable collar or nut $e^5$ on the pitman. The pitman is provided at its lower end with a transversely-slotted yoke $e^6$, which is guided in ways $e^7$ on the standards $b$. A crank-wheel $e^8$, secured to the outer end of one of the radial shafts $c$, is provided with a wrist-pin $e^9$, which projects into the slot of the pitman-yoke and is preferably provided with an antifriction-roller. When the crank-wheel is rotated, the pitman will be reciprocated and raise and lower the press-mold. $e^{10}$, Figs. 1 and 26, represents an adjustable stop, such as a screw carried by the press-mold head and adapted to engage a lug or projection $e^{11}$ on the adjacent standard $b$. When the head is raised, the screw engages the lug before the pitman completes its stroke. The spring is thus compressed and the press-mold is held up against the lug in pressing position for a period of time during the completion of the upward stroke of the pitman and the first portion of its downward stroke. In order to rotate the crank-wheel and raise the press-mold once in one revolution of the carriage and at the proper time to raise the mold to press the blank, each shaft $c$ is provided with a suitable clutch mechanism for locking it to its gear-wheel C. The clutch mechanism shown is constructed as follows, Figs. 1, 4, 11, and 12: F represents a movable clutch member which is splined on the shaft $c$, so as to rotate therewith and be capable of longitudinal movement on the shaft. The clutch member is provided with teeth or projections adapted to engage in corresponding notches in the adjacent face of the gear-wheel C. Each clutch is provided with an operating-lever G, which is divided intermediate of its ends and engages loosely in a circular groove in the hub of the clutch member. The upper end of the lever engages loosely in a hole in a block $g$, provided with stems $g'$, sliding in bearings formed on a bracket $g^2$, which projects inwardly from the adjacent standard $b$. A spring $g^3$ surrounds the outer stem and abuts at one end against an end collar or nut $g^4$ on the stem and at the other end against the fixed stem-bearing and tends to move the block $g^2$ and upper end of the clutch-lever outward to throw the movable clutch member into engagement with the gear-wheel C. The lower end of each clutch-lever is preferably provided with an antifriction-roller, which is adapted to bear against a circular track H, Figs. 1, 4, 12, and 13, on the top of the stationary bed. The track is broken or open at two points $h\ h'$. The portion of the track between the breaks is provided with an inwardly-inclined forward end $h^2$, and the other track portion has an outwardly-inclined forward end $h^3$. In the rotation of the carriage, which turns from right to left, as indicated by the arrows, Figs. 2, 3, and 4, the spring holds the block connected to the upper end of the clutch-lever out against its outer bearing, in which position the roller on the lower end of the clutch-lever is held inside of the main portion of the cam-track. When the roller engages the inwardly-inclined end $h^2$ of the track, the lower end of the lever is thrown outward and the movable clutch member moved toward the gear-wheel until its projections engage the raised portions of the gear-wheel. As the lower end of the lever continues to move outward the lever fulcrums on the movable clutch member, so that its upper end is thrown in and the spring compressed. When the notches in the inner face of the gear-wheel are brought opposite to the teeth on the movable clutch member in the rotation of the gear-wheel, the spring throws the movable clutch outward, projecting the teeth into the notches in the gear-wheel. The shaft $c$ and crank-wheel $e^8$ will then turn with the gear-wheel and make one complete revolution, at the completion of which the roller on the lower end of the clutch-lever will engage the outwardly-inclined portion $h^3$ of the circular track and be moved inwardly, disengaging the clutch member from the gear-wheel. The crank-wheel $e^8$ thus only makes one revolution in one revolution of the carriage, elevating and returning the press-mold, and remains at rest during the remainder of the revolution of the carriage. The inwardly-inclined track portion $h^2$ is preferably hinged and provided with means for swinging it to close the forward break $h$ in the track, so as to prevent the operation of any desired press-mold when expedient or necessary for any reason. For this purpose the track portion $h^2$ is provided with a pin $h^4$, Fig. 13, which projects down through a slot in the bed and is connected by a link $h^5$ to an operating-lever $h^6$. By swinging the lever the track portion $h^2$ can be set at an inward inclination or in line with the circular portions of the track. Any other suitable means may be used for shifting the track portion $h^2$, and if, necessary, a device may be employed for locking it in either position.

I represents the press-plungers. There is one plunger for each press-mold arranged over the same and mounted on the carriage to move toward and from the press-mold. The plunger is carried at the lower end of a plunger-rod $i$, which is guided at its lower end in a bearing-opening $i'$ in the top table and at its upper end in a bearing on a bracket $i^2$, rising from the top table. The plunger is bolted or otherwise detachably secured to the lower end of its rod in any suitable manner. Each plunger is reciprocated by mechanism preferably constructed as follows: The plunger-rod is provided between its bearings with a cross head or bar $i^3$, Figs. 1, 14, and 15, to which are connected the upper ends of vertical operating-rods $i^4$, which extend downwardly through openings in the top table and are fixed at their lower ends to vertical rack-bars $i^5$, which are guided in the vertical guides $e^7$ on the standards $b$, on opposite sides of the operating-pitman for the press-mold. $i^6$ represents gear-pinions journaled on stud-shafts projecting from the standard and arranged one between each rack-bar and the pitman and meshing with rack-teeth on the bars and pitman. When the pitman is moved by its operating-crank, it rotates the gear-pinions, and the rack-bars and press-plunger connected thereto are moved oppositely to the press-mold, so that the mold and plunger meet approximately half-way between their normal separated positions. Thus without increasing the speed of the parts or hurrying the pressing operation it only requires half of the time which would otherwise be necessary for pressing the blank.

The cross head or bar $i^3$ is preferably connected with the plunger-rod through the medium of the yielding pressure-regulating device shown in Figs. 1, 18, 19, and 20, and which is as follows: J represents a collar which is secured in any suitable manner to the plunger-rod beneath the cross head or bar. $j$ represents a pair of links pivoted at their lower ends to one side of the collar J, and $j'$ represents a second pair of links similarly pivoted to the opposite side of the collar. The pairs of links project at an upward inclination from the collar toward the outer ends of the cross-head $i^3$. The upper ends of each pair of links are connected by a pintle $j^2$, on which, between the links, is journaled a roller $j^3$, which bears on the under side of the cross-head. The opposite ends of the pintles are connected by coiled springs $j^4$ on opposite sides of the plunger-rod, which draw the upper ends of the pairs of links toward each other and hold the cross-head up against a collar $j^5$, fixed on the plunger-rod above the cross-head. Normally the links occupy the position shown, which is at an angle somewhat less than forty-five degrees to the vertical, and when the cross-head is drawn downwardly by its operating rack-bars, as before explained, it bears on the rollers at the upper ends of the links and spreads the links apart, thus straining the springs. When the plunger encounters the glass in the press-mold, it forces the same up into and fills the space in the mold around the plunger, when the latter will be arrested; but the cross-head is permitted to continue its downward movement with the rack-bars until the latter complete their downward stroke, in doing which the cross-head bears on the rollers of the regulating device and spreads the links, thus straining the springs $j^4$. The pressure on the plunger-rod increases slightly until the links reach a predetermined inclination, dependent upon the strength of the springs—say approximately a position of forty-five degrees to the vertical—after which in their continued downward movement, although the springs are further strained, the downward pressure on the plunger-rod gradually decreases. By reason of the regulating device described if too large a batch of glass is placed in the press-mold the glass is not subjected to excessive pressure, and the fracturing of the mouth of the jar, which is so frequently done in automatic machines, is avoided. The spring-regulating device and the spring connection before described between the press-mold and its operating-pitman enables the plunger to contact with the glass and press the same to the form of the press-mold, while the mold-head is held by its spring up against the stop-lug $e^{11}$ and before the operating crank and pitman for the mold and plunger reach the end of their strokes. The mold and plunger remain together in pressing relation for a period of time while the press-mold-operating pitman and its crank are completing their upward movement. The spring for the mold holds the latter stationary against the stop-lug at the commencement of the downstroke of the pitman, and as the crank-and-pitman movement for operating the press-mold and plunger causes the parts to move very slowly at the beginning of their movement away from each other the tearing or rupture of the blank is avoided. While the coöperating stops on the mold-head and standard are preferred, they are not absolutely essential.

A companion blow-mold and operating mechanism therefor is provided for each press-mold. The blow-molds K are supported by and arranged equidistant around the mold-table, one adjacent to each press-mold. Each blow-mold, Figs. 3, 9, and 21, is formed of two separable hinged sections which swing toward and from each other in a horizontal plane on a block $k$, which is arranged on the mold-table and has its upper face fashioned to form the bottom of the jar. The hinged sections of the blow-mold shown in the drawings are internally shaped to form the side walls of the jar and the screw-threaded portion of the neck. The blow-mold may, however, be shaped to form the body only of the jar, and the entire neck of the jar may be formed by a neck-mold, which can be substituted for the bead-ring hereinafter described. Each swinging mold-section is provided with an arm $k'$ adjacent to its hinge, and these arms are connected by a toggle-joint $k^2$, composed of links pivoted at their outer ends to the arms and at their inner ends to each other. $k^3$ represents a rod which is pivoted at its outer end to the joint of the toggle-links and extends radially of the mold-table, being preferably provided at its inner end with a roller which is adapted to engage a cam $k^4$, fixed to the upright shaft or axle above the mold-table. The cam is substantially semicircular, having inclined front and rear ends $k^5 k^6$. The rod is moved inward by a spring $k^7$, secured at one end to the rod and at the other end to a fixed part in the mold-table. The rod is preferably pivoted near its inner end to one end of a link $k^8$, the other end of which is pivoted to a bearing-block on the mold-table and is guided at its outer portion between antifriction-rollers $k^9$, journaled on pins rising from the mold-table. When the roller on the rod is not in engagement with its cam, the spring moves it inward, the toggle-links are drawn inwardly, and the mold-sections swung apart or the mold opened. When in the rotation of the mold-table the roller on the inner end of the rod engages the forward inclined end of its operating-cam, the rod is moved outwardly, and the toggle-joint straightened, which moves the blow-mold sections together to close the mold. The movement of the rod is sufficient to throw the toggle-links to or beyond the dead-center position, which lies in a line connecting the joints of the links with the arms on the mold-sections when the latter are closed. The blow-mold is thus held positively closed, and the cam and antifriction-roller on the end of the rod are relieved from any thrust due to the air-pressure in the jar in the blow-mold tending to separate the mold-sections. The parts are therefore relieved from considerable wear and friction. The blow-mold is retained closed while the roller on the operating-rod travels around the circular portion of the operating-cam. When the roller reaches the inclined rear end of the cam, the spring forces it inwardly, the toggle-joint is broken, and the mold-sections separated.

L represents the blowpipe, of which there is one for each blow-mold, suspended on the rotary carriage over its blow-mold. The blowpipe is hollow and is provided at its lower end with a blow-head adapted to rest on and form a tight joint with the bead-ring when the latter is on the blow-mold. Each blowpipe passes loosely through a bearing $l$ in the top table or support and through a bearing-plate $l'$, suspended by rods $l^2$, depending from the top table. The blowpipe is provided between its bearings with a fixed collar $l^3$ and surrounding the blowpipe between the collar and the bearing-plate is a coiled spring, which abuts at its upper end against the fixed collar and at its lower end against a loose thrust-collar $l^4$, which is supported by balls on the bearing-plate $l'$. The spring normally holds the blowpipe up in the position shown in Fig. 14.

The bead-ring which is shown in the drawings, Figs. 14, 15, 22, to 25, is intended to form the small bead or lip at the mouth of the jar and support the pressed blank when the press-mold recedes and until the blank is moved into the blow-mold. A bead-ring and operating mechanism therefor is provided for each press-mold and its companion blow-mold. The bead-ring is composed of separable sections or halves $m$, which are provided in their opposing faces with semicircular bead molding or forming recesses $m'$. The bead-ring instead of forming only the small mouth-lip may be constructed to form the threaded portion of the neck of the jar. The bead-ring sections are mounted to move toward and from each other on separated parallel arms $m^2$, which project horizontally from a crane N, which is capable of a horizontal swinging and vertical movement. The crane is carried by a tubular crane-shaft $n$, which loosely surrounds one of the vertical operating-rods connected to the cross-head of the press-plunger. The tubular crane-shaft $n$ extends loosely through an opening in the top table or support and through a bearing-plate $n'$, which is suspended beneath the top table by depending rods or hangers $n^2$. The crane-shaft $n$ has fixed thereto between the top table and the bearing-plate $n'$ a collar $n^3$, and between the collar and the bearing-plate is a coiled spring $n^4$, which surrounds the crane-shaft and abuts at its upper end against the collar and at its lower end against a thrust-collar $n^5$, supported by balls on top of the bearing-plate. The spring $n^4$ tends to elevate the crane. The lower end of the tubular crane-shaft passes through and is steadied or guided by a bearing $n^6$, secured to the mold-table. When the press-mold and plunger approach each other to press the blank, the bead-ring stands between them and the press-mold abuts against the under side of the bead-ring, the plunger passing down through the bead-ring. Each plunger is provided with a plunger-ring O for completing the press-mold and shaping the end of the neck or mouth when the blank is pressed. The plunger-ring should fit the plunger quite snugly to prevent the formation of a fin on the mouth of the jar, and in order to prevent the plunger-ring from cutting or marring the plunger and forming an imperfect jar it is necessary to hold the plunger-ring squarely and firmly on the bead-ring while the plunger continues its movement into the press-mold. To accomplish this, the plunger-ring is secured to a hollow cylindrical head $o'$, which slidably surrounds a cylindrical head $o^3$ on the plunger-stem and is held down yieldingly by a coiled spring $o^2$, which surrounds the plunger-stem and abuts at its upper end against a collar on the latter and at its lower end against the hollow head. When the plunger enters the press-mold, the plunger-ring is held by its spring firmly on top of the bead-ring, as shown in Fig. 26, and the described sliding engagement of the ring with the plunger prevents any lateral play or tilting of the plunger-ring. After the press-mold and plunger have left the blank, which is supported by its bead in the bead-ring, the crane is swung to carry the blank into the blow-mold.

The mechanism shown for swinging the crane to carry the blank into the blow-mold is constructed as follows, Figs. 2, 5, 6, and 21: On the upper end of the tubular crane-shaft is fixed a pinion $p$, which meshes with a segment P and which is pivoted at $p'$ on a stud rising from the top plate or support of the carriage. The inner end of the segment has a laterally-projecting arm $p^2$, which is preferably provided with an antifriction-roller, which bears on the periphery of a cam-disk $p^3$, fixed on the central upright shaft of the machine above the top table or support. The cam is provided with two segmental circular portions of different diameter, which are connected by inclined or cam portions $p^4 \, p^5$. In the rotation of the carriage the roller at the end of the segment-arm travels around on the edge of the cam-disk $p^3$, and when it reaches the forward inclined portion $p^4$ the segment is swung on its pivot and its gear-teeth meshing with the gear-wheel on the tubular crane-shaft turns the latter and holds it in the position to which it is turned, while the segment-roller remains on the salient portion of the cam-disk. When the segment-roller rides down on the other inclined portion $p^5$ of the cam-disk, the segment is permitted to return to its normal position, which is accomplished by a spring $p^6$, connected at one end to the segment and at the other end to a suitable fixed part of the carriage. The throw of the segment is preferably made adjustable. For this purpose the lateral arm $p^2$ of the segment is pivoted to the segment and is held stationary by a brace-rod $p^7$, which is pivoted at one end to the outer portion of the arm and at the other end passes through an eye or lug $p^8$ on the segment, the brace-rod being held in adjusted positions by means of jam-nuts screwed on the rod on opposite sides of said lug.

It is necessary to accurately center the bead-ring on the blow-mold, and for this purpose the blow-mold is provided with a raised annular flange $q$, adapted to engage in a corresponding depression or socket in the bottom of the bead-ring. When the bead-ring is swung horizontally by the crane to carry the blank into the blow-mold, the bead-ring is on a horizontal plane somewhat above the top of the blow-mold, as indicated in Fig. 14$^\text{a}$, in order to enable the bead-ring to pass over the flange on the top of the blow-mold. After the bead-ring has been positioned over the blow-mold it is lowered until it rests on the top of the blow-mold. It is also necessary to lower the blowpipe L onto the top of the bead-ring after the latter has been lowered on top of the blow-mold. The mechanism shown for lowering the bead-ring and blowpipe is constructed as follows, Figs. 1, 2, 5 to 8, and 21:

The cam-disk $p^3$ for operating the crane-actuating segments is provided on its under side with a cam rib or flange Q, which extends for a portion of a circle concentric with the axis of rotation of the carriage, has an inclined forward end and a stepped rear end.

$q'$ represents a rock-shaft which is journaled in suitable bearings $q^2$ on the top table or support of the carriage and extends radially thereof. The inner end of the rock-shaft is provided with a rock-arm $q^3$, preferably provided at its outer end with an antifriction-roller which rolls on the under face of the cam-disk $p^3$ in the rotation of the carriage and is adapted to be depressed and rock the rock-shaft when the roller engages the depending cam-rib Q. The outer end of the rock-shaft is provided with a rock-arm $q^4$, which is connected by a link $q^5$ to a lever $q^6$ between the ends thereof. One end of the lever is bifurcated and is pivoted on a collar $q^7$, Fig. 21, loosely supported on the gear-wheel $p$ on the upper end of the tubular crane-shaft. The other end of the lever rests upon and is pivotally connected to the upper end of the blowpipe L. When the cam-rib depresses the rock-arm $q^3$, the rock-shaft $q'$ is rocked and the lever $q^6$ is moved downwardly and carries down with it the crane and blowpipe. The tension of the springs which support the crane and the blowpipe and the relative length of the arms of the lever $q^6$ are so proportioned that when the rock-shaft is rocked and the link $q^5$ drawn downwardly the crane will be first lowered to drop the bead-ring on the blow-mold, and after the bead-ring is arrested the blowpipe will move down and bear tightly on the top of the bead-ring. When the rock-arm passes off of the highest part of the cam to the step at the rear end thereof, the blowpipe will be first lifted slightly off of the bead-ring before the latter is opened and moved up off from the blow-mold. After the bead-ring is opened the rock-arm $q^3$ passes off of the step of the cam-rib, and the further movement of the rock-shaft permits the crane to be lifted by its spring. After the jar is blown the blowpipe is raised off of the bead-ring, as described, so as not to bind the same, and the bead-ring is then opened to release the jar and leave it in the blow-mold.

The mechanism shown for separating the bead-ring sections is constructed as follows, (see Figs. 21 to 25:) $r$ $r'$ represent slide-blocks which are mounted to slide on the supporting-arms for the bead-ring sections. The block $r$ is connected to the adjacent bead-ring section by tubes $r^2$, which are screw-threaded into sockets in the bead-ring section and block for adjusting the position of these parts relative to each other. The other slide-block $r'$ and other bead-ring section are connected by rods $r^3$, which pass through the tubes $r^2$, to the other slide-block. These rods are also preferably connected adjustably to the bead-ring section and slide-block. R represents a cam or wedge which is loosely mounted on the tubular shaft of the crane adjacent to the operating slide-blocks for the bead-ring sections. The wedge is provided with oppositely inclined or converging slots, in which engage pins on the two slide-blocks. The pins are preferably provided with antifriction-rollers. When the cam-head is raised, the slide-blocks are forced apart and, through their connections with the bead-ring sections, draw the latter together. The wedge is raised and lowered to open and close the bead-ring by the following means, Figs. 1, 3, 9, 10, and 22: S represents a cam-track which is secured to the stationary upright shaft or axle of the machine above the mold-table and below the cam for operating the blow-mold. The cam is circular concentric with the upright shaft nearly throughout its circumference and is provided with a depressed or reëntrant portion at one side thereof. $s^2$ represents a rod which is arranged radially of the mold-table and is preferably provided at its inner end with an antifriction-roller adapted to travel on the cam-track S. The rod is connected at its outer end by a link $s^3$, Figs. 9 and 22, to the depending arm of a bell-crank lever $s^4$, which is pivoted at its angle on a bearing-bracket $s^5$, which projects from a sleeve or bushing loosely surrounding the hollow crane-shaft and movably supported in the bearing for the lower end of the latter. The horizontal arm of the bell-crank lever $s^4$ is bifurcated and pivoted to a ring loosely surrounding the hub of the wedge R. The rod $s^2$ is preferably pivoted at its inner end to one end of a link $s^6$, the other end of which is pivoted on the mold-table and is guided between antifriction-rollers $s^7$, journaled on suitable pins rising from the mold-table. The rod is held toward the cam S by a spring $s^8$, one end of which is secured to the rod and the other end to a suitable fixed part of the mold table or carriage. When the inner end of the rod $s^2$ arrives opposite to the depressed portion of its operating-cam S, the rod is thrown inwardly by its spring and swings the bell-crank lever $s^4$, so as to throw the horizontally-projecting arm of the latter downwardly and lower the wedge R on the tubular crane-shaft. The downward movement of the wedge separates the sections of the bead-ring to disengage the neck of the jar in the blow-mold. The arrangement of the depressed portion of the cam S is such that the wedge R is lowered and the bead-ring opened just after the blowpipe is raised from the bead-ring and before the bead-ring is raised from the blow-mold. Immediately after the bead-ring is opened the crane is elevated by its spring, as before explained.

The air-compressing mechanism for blowing the jars is constructed as follows, (see Figs. 1, 14, and 15:) Each press-plunger stem is provided at its upper end with a piston T, which reciprocates in an air-compressing cylinder $t$, secured to the guide-bracket for the plunger-stem. Each cylinder is connected by a flexible hose or tube $t'$ with the upper end of a blowpipe, preferably the one for the blow-mold which immediately precedes the press-plunger in the direction of rotation of the mold-table. $t^2$ represents an inlet-valve for the cylinder, and $t^3$ represents a relief-valve to permit the escape of air in case of excessive pressure in the blowpipe and tube. When a plunger moves down to press the blank, the piston at the upper end of its stem moves downwardly in its cylinder, drawing air into the latter, and when the plunger returns or moves away from the press-mold the air is compressed and forced through the tube and blowpipe connected thereto into the blank in the blow-mold beneath said blowpipe. The jar is blown while the carriage is rotating. This manner of blowing the jars produces excellent results. For the commencement of the blowing operation the air is at the atmospheric pressure in the cylinder and the pressure is gradually increased. The body of the jar, which requires but very little pressure, is therefore blown first and gradually, after which the screw-threaded neck, which requires a considerably greater air-pressure, is blown. This prevents the sudden expansion of the body of the jar and the consequent uneven thickness of the walls of the same, which is the usual result where the air is supplied to the jar from a compressed-air tank or reservoir.

It is desirable to jar the blow-mold slightly to loosen the glass jar in the same before the mold is opened completely in order to prevent any damage to the jar in case the glass adheres to the blow-mold. For this purpose the cam for opening and closing the blow-mold is provided near the rear end of its circular portion with one or more shallow notches U, into which the roller on the operating-rod for the blow-mold is thrown by its spring. The notches are only deep enough to permit a very slight movement of the rod, so that the mold-sections are vibrated or moved from and toward each other a very slight distance one or more times. This effectually loosens the jar in the blow-mold without damage to the jar.

The gatherer introduces a batch of molten glass into a press-mold E when the latter is at about the point occupied by the press-mold at the upper left-hand side of the carriage in Fig. 3, at which time the bead-ring $m$ is closed and located over the press-mold, the blow-mold K is open, the clutch F has been thrown to couple the gear-wheel C for said press-mold to its shaft and the press-mold moving upward. The press-mold is moved up against the under side of the bead-ring, and the plunger I is moved down through the bead-ring into the press-mold by the described operating mechanism. The plunger presses the molten glass, forcing it up in the press-mold and bead-ring $m$, which latter forms the bead or lip at the top of the blank. The press-mold E and plunger I then recede or separate, leaving the blank suspended by its bead in the bead-ring, and the clutch F is thrown out of engagement with the gear-wheel C, so that the press-mold and plunger remain separated. The crane N is then turned horizontally by its operating means to swing the bead-ring from the position it occupied over the press-mold to a position vertically over the blow-mold and beneath the lower end of the blowpipe L above the blow-mold. The blow-mold is open, so that the blank swings horizontally into the blow-mold through the open side thereof. The operating-rod $k^3$, Fig. 3, for the blow-mold then engages the face $k^5$ of its operating-cam $k^4$, and the blow-mold is closed around the blank, after which the bead-ring is lowered on the blow-mold and the blowpipe lowered on the bead-ring in the manner described. The piston T of the cylinder $t$ to which the blowpipe is connected is now moved up by the rising press-plunger to which it is connected, compressing air in the cylinder and forcing it under pressure into the blank, blowing the same to the internal form of the blow-mold. The blowpipe is then raised off of the bead-ring and the latter opened to release the blank and raised from the blow-mold in the manner described, after which the arm of the operating-segment P, Fig. 2, for the crane N rides down the inclined face $p^5$ of the cam $p^3$, and the segment is turned by its spring to swing the bead-ring $m$ around horizontally over the press-mold ready for the pressing of the next blank. The finished article remains in the blow-mold until the glass has cooled sufficiently for it to properly set or until the operating-rod $k^3$ for the blow-mold engages the shallow depressions U of the cam $k^4$, Fig. 3, which jar or vibrate the blow-mold sections slightly and loosen the article, after which the operating-rod rides down the inclined face $k^6$ of the cam and the blow-mold is opened by its spring $k^7$, so that the finished article can be removed by an attendant. As before explained, all of the above-described operations are performed automatically during the continuous rotation of the carriage and the finished article is taken from the blow-mold just before its companion press-mold arrives at the charging-point. The press-molds are charged successively, the blank formed, and the article blown by repetitions of the operations recited.

We claim as our invention—

1. The combination of a press-mold and a cooperating oppositely-arranged press-plunger which are movable horizontally together in the same direction, and means for moving both said press-mold and press-plunger toward each other to press the blank while they are moving horizontally, substantially as set forth.

2. The combination of a support, and means for moving the same, a coöperating press-mold and press-plunger arranged opposite to each other on said support and movable therewith, and means for moving both press mold and plunger toward each other to press the blank while they are moving with said support, substantially as set forth.

3. The combination of a support, and means for rotating the same horizontally, of a coöperating press mold and plunger carried by said support and movable horizontally therewith, and means for moving both said press mold and plunger vertically toward each other to press the blank while they are moving with said support, substantially as set forth.

4. The combination of a press-mold and a coöperating press-plunger which are movable horizontally together in the same direction, and means movable horizontally with said press mold and plunger for moving both said press mold and plunger toward each other to press the blank while they are moving horizontally, substantially as set forth.

5. The combination of a support, and means for moving the same, a coöperating press-mold and press-plunger carried by and movable with said support, and means operated by the movement of said support for moving both said press mold and plunger toward each other to press the blank while they are moving with said support, substantially as set forth.

6. The combination of a support, and means for moving the same, a coöperating press-mold and press-plunger carried by and movable with said support, and means movable with and operated by the movement of said support for moving both said press mold and plunger toward each other to press the blank while they are moving with said support, substantially as set forth.

7. The combination of a movable support, a press-mold and coöperating press-plunger mounted on said support, a wheel carried by said support and rolling on a track, and connections between said wheel and said press mold and plunger for moving the same toward each other to press the blank, substantially as set forth.

8. The combination of a press-mold, a coöperating press-plunger, a crank, a pitman connecting said crank and press-mold, a rack-bar connected to said press-plunger, and a gear geared to rack-teeth on said pitman and rack-bar, substantially as set forth.

9. The combination of a movable support, a press-mold, and coöperating press-plunger mounted on said support, a wheel carried by said support and rolling on a track, and connections between said wheel and press-mold for moving the latter to press the blank, substantially as set forth.

10. The combination of a movable support, a blank-pressing mechanism carried by said support, a device operated by the movement of said support, and connections including a clutch between said device and said blank-pressing mechanism, whereby the latter is operated during a portion only of the movement of the support, substantially as set forth.

11. The combination of a movable support, a press-mold and a coöperating press-plunger carried by said support, a wheel movable with said support and rolling on a track, and connections between said wheel and press-mold including a clutch, whereby the mold is operated during a portion only of the movement of said support, substantially as set forth.

12. The combination of a movable support, a press-mold and a coöperating press-plunger mounted on said support, a wheel movable with said support and rolling on a track, a crank connected to said press-mold, and a clutch device for connecting said wheel to said crank, substantially as set forth.

13. The combination of a movable support, a press-mold and a coöperating press-plunger mounted on said support, a crank, connections between said crank and said press mold and plunger for oppositely moving the same, a wheel movable with said support and rolling on a track, and a clutch device for coupling said wheel to said crank, substantially as set forth.

14. The combination of a movable support, a blank-pressing apparatus movable with said support, an operating device, connections including a clutch between said operating device and said pressing apparatus, a clutch-operating lever movable with said support, and a part adapted to engage and move said clutch-lever, substantially as set forth.

15. The combination of a movable support, a press-mold and coöperating press-plunger mounted on said support, an operating device, connections between said operating device and said press-mold including a clutch, a clutch-operating lever and a part adapted to engage and move said lever, substantially as set forth.

16. The combination of a movable support, a press-mold and a coöperating press-plunger carried by said support, an operating device for said press-mold, a clutch and connections between said operating device and said press-mold, an operating-lever for said clutch, a fixed part adapted to engage said clutch-lever to move the same, and a spring which acts to move said clutch-lever to connect said clutch and said device, substantially as set forth.

17. The combination of a press-mold and a coöperating press-plunger which are arranged opposite to each other and are movable horizontally together in the same direction, means for supporting the blank arranged between said press mold and plunger, and mechanism for moving both said press mold and plunger toward said blank-supporting means during the horizontal movement of said press mold and plunger, substantially as set forth.

18. The combination of a press-mold and a coöperating press-plunger which are arranged opposite to each other and are movable horizontally together in the same direction, a bead-ring arranged between said press-mold and said press-plunger for forming a bead on the blank and supporting said blank, and mechanism for moving both the press-mold against said bead-ring and moving the press-plunger into said press-mold during the horizontal movement of said press mold and plunger, substantially as set forth.

19. The combination of a horizontally-movable blank-pressing mechanism, a blow-mold movable with said pressing mechanism and adapted to open at the vertical side thereof, a device for supporting the blank, and means for moving said device to carry the blank horizontally into the blow-mold while the latter is in motion, substantially as set forth.

20. The combination of a frame, a movable support thereon, a press-mold and a coöperating press-plunger carried by said movable support, mechanism for moving said press-mold to press the blank, a blow-mold carried by said movable support, and a device arranged on said movable support between said press mold and plunger for supporting the blank and moving the same horizontally into the blow-mold, substantially as set forth.

21. The combination of a blank-pressing mechanism, a blowing mechanism, and a device for supporting the blank, all of which parts are movable together in the same direction, and means for operating said supporting device to transfer the blank from the pressing mechanism to the blowing mechanism while said mechanisms are in motion, substantially as set forth.

22. The combination of a movable support, a press-mold, a press-plunger carried by said movable support, mechanism for moving said press mold and plunger toward each other, a blow-mold carried by said movable support, a bead-ring arranged between said press mold and plunger for forming a bead on the blank, and means for operating said bead-ring to transfer the blank from said press-mold to said blow-mold while the latter is in motion, substantially as set forth.

23. The combination of a continuously-moving support, blank-pressing mechanism movable with said support, blowing mechanism movable with said support, and means for transferring the blank from said pressing mechanism to said blowing mechanism, substantially as set forth.

24. The combination of a continuously-moving support, a coöperating press mold and plunger movable with said support, mechanism for operating said press mold and plunger to press the blank, blowing mechanism movable with said support, and mechanism for transferring the blank from said pressing mechanism to said blowing mechanism, substantially as set forth.

25. The combination of a frame, a movable support mounted on said frame, a coöperating press mold and plunger movable with said support, mechanism for operating said press mold and plunger to press the blank, a blow-mold movable with said support, a bead-ring arranged between said press mold and plunger for forming a bead on the blank and supporting the latter, and means for moving said bead-ring to carry the blank into said blow-mold, substantially as set forth.

26. The combination of a horizontally-rotating support, a coöperating press mold and plunger mounted on said support, mechanism for operating said press-mold to press the blank, a blow-mold mounted on said movable support, a bead-ring for forming a bead on the blank and supporting said blank, and means for moving said bead-ring horizontally to carry said blank into the blow-mold, substantially as set forth.

27. The combination of a frame, a horizontally-movable support on said frame, a coöperating press-mold and press-plunger mounted on said support and movable vertically, mechanism for moving said press mold and plunger, a blow-mold carried by said movable support, a bead-ring arranged between said press-mold and said plunger for forming a bead on the blank and supporting the same, and means for moving said bead-ring horizontally to carry the blank into the blow-mold, substantially as set forth.

28. The combination of a blank-pressing mechanism, a blow-mold formed of separable sections, a device for supporting the blank, means for moving said device to carry the blank horizontally into the blow-mold, and means for lowering said device on the blow-mold, substantially as set forth.

29. The combination of a coöperating press-mold, and press-plunger, mechanism for moving the press-mold vertically toward said plunger, a device arranged between said press mold and plunger for supporting the blank, a blow-mold, means for moving said device horizontally over said blow-mold, and means for lowering said device on the blow-mold, substantially as set forth.

30. The combination of blank-pressing mechanism, a device for supporting the blank, a blow-mold formed of separable sections, a blow-pipe, mechanism for moving said supporting device horizontally to carry the blank horizontally into the blow-mold, and means for lowering said supporting device on the blow-mold and said blow-pipe on said supporting device, substantially as set forth.

31. The combination of blank-pressing mechanism, a device for supporting the blank, a blow-mold, means for moving said device over said blow-mold, a blow-pipe over said device, and a lever common to said device and said blow-pipe for lowering the same toward said blow-mold, substantially as set forth.

32. The combination of a blank-pressing mechanism, a blow-mold, a coöperating blow-pipe, a bead-ring composed of separable sections for forming a bead on the blank and supporting the same, mechanism for separating said bead-ring sections to release the blank, and a common mechanism acting to first lift said blow-pipe away from the bead-ring and then lift the bead-ring off of the blow-mold, substantially as set forth.

33. The combination of a blank-pressing mechanism, a blow-mold, a coöperating blow-pipe, a bead-ring composed of separable sections for forming a bead on the blank and supporting the same, mechanism for separating said bead-ring sections to release the blank, a crane carrying said bead-ring, springs for raising said crane and blow-pipe, a lever fulcrumed on said crane and said blow-pipe, and means for operating said lever to permit said springs to raise said blow-pipe and said crane, substantially as set forth.

34. The combination of a blank-pressing mechanism, a blow-mold, a bead-ring for forming a bead on the blank and supporting the same, a horizontally and vertically moving crane carrying said bead-ring, mechanism for turning said crane to carry the blank from said pressing mechanism to said blow-mold, a spring supporting said crane and acting to lift the same, and means for lowering said crane to place said bead-ring on said blow-mold, substantially as set forth.

35. The combination of a blank-pressing mechanism, a bead-ring composed of separable sections, means for supporting said sections, slide-blocks connected to said sections, a device movable at right angles to the direction of movement of said slide-blocks, and inclined faces on said device engaging portions carried by said slide-blocks, substantially as set forth.

36. The combination of a bead-ring composed of separable sections, a support on which said sections are movable from and toward each other, a shaft carrying said bead-ring support, mechanism for turning said shaft, a device movable longitudinally of said shaft and connected with said bead-ring sections to move the same toward and from each other, and mechanism for operating said device, substantially as set forth.

37. The combination of a mold composed of swinging sections provided with rigid arms, toggle-links pivoted to said arms and to each other, a rod connected to the joint of said toggle-links for operating said mold-sections, and means for operating said rod to throw said toggle-links into a dead-center position when said mold-sections are moved to their limit toward each other, substantially as set forth.

38. The combination of a frame, a rotary support thereon, a pressing mechanism carried by said support, a blow-mold carried by said support, and a device carried by said support for transferring the blank from said pressing mechanism to said blow-mold, substantially as set forth.

39. The combination of a frame, a rotary support thereon, a coöperating press mold and plunger carried by said support, mechanism for operating said press mold and plunger, a blow-mold carried by said movable support, a bead-ring carried by said movable support for forming a bead on the blank and supporting the same, and mechanism for moving said bead-ring to carry the blank from the pressing mechanism to said blow-mold, substantially as set forth.

40. The combination of a blank-pressing mechanism, means for operating the same, a blow-mold, an air-compressing apparatus operated by said pressing mechanism, and an air-supply conduit from said air-compressing apparatus to said blow-mold, substantially as set forth.

41. The combination of a coöperating press mold, and plunger, operating mechanism therefor, a blow-mold, an air-compressing apparatus connected to and operated by said press-plunger, and an air-conduit leading from said air-compressing apparatus to said blow-mold, substantially as set forth.

42. The combination of a coöperating press mold and plunger, a blowing mechanism, an air-compressing cylinder, a piston connected to and operated by said press-plunger and operating in said cylinder, and a conduit for the compressed air from said cylinder to said blowing mechanism, substantially as set forth.

43. The combination of a continuously-movable support, a blow-mold movable with said support, an air-compressing apparatus movable with said support and connected with said blow-mold, and mechanism for operating said air-compressing apparatus during the movement of said support, substantially as set forth.

44. The combination of a movable support, a blank-pressing mechanism movable with said support, a blow-mold movable with said support, an air-compressing apparatus movable with said support, operative connections between said air-compressing apparatus and pressing mechanism whereby the former is operated by the latter, and an air-conduit connecting said air-compressing apparatus and said blow-mold, substantially as set forth.

45. The combination of a movable support, a coöperating press mold and plunger movable with said support, mechanism for operating said plunger during the movement of said support, a cylinder movable with said support, a piston operated by said plunger and working in said cylinder, a blow-mold movable with said support, and an air-conduit from said cylinder to said blow-mold, substantially as set forth.

46. The combination of a coöperating press mold and plunger, movable operating means for one of said parts, a lever connected to said part and which is acted upon by said operating means to move said part, one or more springs which oppose the yielding movement of said lever, said spring and lever acting to decrease the pressure of said operating means on said part after a predetermined pressure is reached, substantially as set forth.

47. The combination of a press-mold, a coöperating press-plunger, movable operating means for said plunger, a lever connected to said plunger and which is acted upon by said operating means to move said plunger, one or more springs which oppose the yielding movement of said lever, said springs and lever acting to decrease the pressure of said operating means on said plunger after a predetermined pressure is reached, substantially as set forth.

48. The combination of a coöperating press mold and plunger, a head loosely connected with said plunger, means for moving said head, links pivoted to said plunger and carrying parts engaging with said head, and one or more springs connecting said links, substantially as set forth.

49. The combination of a coöperating press mold and plunger, a head movably connected with said plunger, means for moving said head, diverging links pivoted to said plunger, and carrying at their outer ends rollers engaging said head, and one or more springs connecting the outer ends of said links and acting to move the same toward each other, substantially as set forth.

50. The combination of a press-mold and a coöperating plunger, a plunger-rod to which the plunger is secured, a plunger-ring loosely surrounding the plunger, a hollow head carrying said ring and slidably mounted on said plunger-rod, means inclosed by said hollow head for guiding the latter, and a coiled spring surrounding the plunger-rod and acting against said hollow head, substantially as set forth.

51. The combination of a mold composed of separable sections, means for opening the mold to discharge the molded article, and means for causing a slight movement of the mold-sections from and toward each other to loosen the article in the mold before the latter is opened to discharge the article, substantially as set forth.

52. The combination of a mold composed of separable sections, a cam, and operative connections between said cam and mold for opening the latter to discharge the molded article, said cam having an uneven portion for causing a slight movement of the mold-sections from and toward each other to loosen the molded article in the mold before the latter is opened to discharge the article, substantially as set forth.

Witness our hands this 26th day of June, 1902.

FRANCIS W. PAWLING.
  FRANK R. MILLER.

Witnesses:
  GEO. E. ENNISON,
  JNO. J. BONNER.